(12) United States Patent
Welle et al.

(10) Patent No.: US 11,063,368 B2
(45) Date of Patent: Jul. 13, 2021

(54) ANTENNA ASSEMBLY FOR A LEVEL GAUGE

(71) Applicant: VEGA Grieshaber KG, Wolfach (DE)

(72) Inventors: Roland Welle, Hausach (DE); Steffen Walde, Niedereschach (DE); Karl Griessbaum, Muhlenbach (DE)

(73) Assignee: VEGA Grieshaber KG, Wolfach (DE)

(*) Notice: Subject to any disclaimer, the term of this patent is extended or adjusted under 35 U.S.C. 154(b) by 741 days.

(21) Appl. No.: 15/563,450

(22) PCT Filed: Apr. 1, 2015

(86) PCT No.: PCT/EP2015/057236
§ 371 (c)(1),
(2) Date: Jun. 4, 2018

(87) PCT Pub. No.: WO2016/155822
PCT Pub. Date: Oct. 6, 2016

(65) Prior Publication Data
US 2018/0301818 A1    Oct. 18, 2018

(51) Int. Cl.
*H01Q 21/06* (2006.01)
*G01F 23/284* (2006.01)
(Continued)

(52) U.S. Cl.
CPC ......... *H01Q 21/061* (2013.01); *G01F 23/284* (2013.01); *G01S 7/03* (2013.01); *G01S 7/032* (2013.01); *G01S 13/88* (2013.01); *G01S 13/89* (2013.01); *H01Q 1/225* (2013.01); *H01Q 3/04* (2013.01); *H01Q 21/08* (2013.01)

(58) Field of Classification Search
CPC ....... H01Q 21/061; G01F 23/284; G01S 7/03; G01S 7/032; G01S 7/88
See application file for complete search history.

(56) References Cited

U.S. PATENT DOCUMENTS 7,561,113 B2    7/2009  Lenk
9,310,478 B2    4/2016  Gross et al.
(Continued)

FOREIGN PATENT DOCUMENTS

CN        1719207 A       1/2006
CN      102612658 A       7/2012
(Continued)

OTHER PUBLICATIONS

International Search Report dated Dec. 11, 2015 for International Application No. PCT/EP2015/057236.
(Continued)

*Primary Examiner* — Marc Anthony Armand
(74) *Attorney, Agent, or Firm* — Hunton Andrews Kurth LLP

(57) ABSTRACT

An antenna assembly for a level radar for detecting a topology of a filling material surface is provided. For example, the antenna assembly comprises antenna elements which are designed and/or configured to transmit and/or receive the electromagnetic measurement signal. The distances between adjacent elements are non-equidistant with respect to one another, and the minimum distance between two elements can correspond to one half of a wavelength of the electromagnetic measurement signal.

11 Claims, 6 Drawing Sheets

(51) Int. Cl.
*G01S 13/89* (2006.01)
*H01Q 1/22* (2006.01)
*H01Q 3/04* (2006.01)
*H01Q 21/08* (2006.01)
*G01S 7/03* (2006.01)
*G01S 13/88* (2006.01)

(56) References Cited

U.S. PATENT DOCUMENTS

| | | | |
|---|---|---|---|
| 2012/0223852 A1* | 9/2012 | Gross | H01Q 21/065 342/70 |
| 2016/0036124 A1* | 2/2016 | Schoor | G01S 13/931 342/81 |
| 2016/0238702 A1* | 8/2016 | Muldowney | G01S 7/40 |
| 2016/0352437 A1 | 12/2016 | Welle et al. | |
| 2017/0167865 A1 | 6/2017 | Welle et al. | |
| 2017/0174437 A1 | 6/2017 | Wolfe et al. | |
| 2017/0184437 A1 | 6/2017 | Welle et al. | |

FOREIGN PATENT DOCUMENTS

| | | | |
|---|---|---|---|
| DE | 10149851 A | * 10/2001 | ........... G01F 23/284 |
| DE | 10036131 A1 | 2/2002 | |
| DE | 10149851 | 4/2003 | |
| DE | 102004041857 | 3/2006 | |
| DE | 102009029503 A1 | 3/2011 | |
| DE | 102012106938 | 1/2014 | |
| WO | 03034004 A1 | 4/2003 | |
| WO | 2007138552 A2 | 12/2007 | |
| WO | WO 2010/144936 | 12/2010 | |
| WO | 2014019778 A1 | 2/2014 | |
| WO | 2015120880 A1 | 8/2015 | |
| WO | 2015120883 A1 | 8/2015 | |
| WO | 2015120885 A1 | 8/2015 | |

OTHER PUBLICATIONS

Written Opinion dated Dec. 11, 2015 for International Application No. PCT/EP2015/057236.
First Office Action dated May 23, 2019 for Chinese Patent application No. 201580079018.8.

* cited by examiner

ANTENNA ASSEMBLY FOR A LEVEL GAUGE

RELATED APPLICATION(S)

The present application is a national phase of International Application No. PCT/EP2015/057236 filed on Apr. 1, 2015, which published as International Patent Publication WO 2016/155822 on Oct. 6, 2016, the entire disclosures of which are incorporated herein by reference.

FIELD OF THE DISCLOSURE

The present disclosure relates to fill level measurement devices and methods for determining the fill level of a filling material and/or bulk material in a container. In particular, the present disclosure relates to antenna assemblies and measurement devices for detecting the three-dimensional surface topology of a filling material or bulk material using an electromagnetic signal, to a corresponding calculation method for establishing the fill level, volume or mass of the filling material or bulk material, and to a computer-readable medium providing the same.

BACKGROUND INFORMATION

Topology-detecting fill level measurement devices can be used to determine the fill level of a filling material or bulk material in a container, which devices sample the filling material surface or bulk material surface using an electromagnetic signal, and can also utilize the information, derived therefrom, relating to the three-dimensional surface topology of the filling material or bulk material in order to establish the volume of the filling material, assuming that the surface area below the filling material is known, or to establish the mass, or other variables that can be derived therefrom, when the density is known.

Fill level measurement devices of this type generally comprise an antenna assembly that is connected to a control and evaluation unit via an antenna support. The antenna assembly generally has a plurality of transmission elements and receiving elements, which can be generically referred to as "elements" herein. An electromagnetic measurement signal emitted by the transmission elements is reflected by the filling material surface, and picked up by the receiving elements. In this case, the fill level measurement devices are designed such that the reflected measurement signal can be picked up from various angular ranges.

For example, one configuration of an antenna assembly for a fill level measurement device may have approximately 20×20 elements when said antenna assembly is a planar antenna assembly. If the elements are designed such that they can each be actuated and read out individually, highly complex hardware and significantly complex software are involved. Individually actuating and evaluating the elements of an antenna array, which can be for example planar and two-dimensional, makes it possible, for example, to establish a three-dimensional surface topology from the measurement signals reflected by the filling material surface or bulk material surface, without mechanically adjusting the antenna assembly.

SUMMARY OF THE PRESENT DISCLOSURE

One of the objects of the present disclosure is to facilitate a detecting the topology of a filling material surface in a less complex manner.

This exemplary object can be achieved by the subject matter of the independent claims. Additional exemplary embodiments of the present disclosure are provided in the dependent claims, the following description and the drawings.

In order to improve readability, an exemplary case of filling material in a container is provided. It should be understood that the present disclosure and the associated examples of an exemplary use thereof is not limited in any manner, and e.g., can also relate to bulk material. Similarly, the filling material and/or the bulk material does not necessarily have to be located in a container. For example, it is possible that the bulk material can be provided on a conveyor belt. In such exemplary case, the fill level measurement device can be attached to the antenna assembly at a point above the conveyor belt. Moreover, the measurement device according to the exemplary embodiment of the present disclosure can be used to determine the surface contour of a moving liquid.

Furthermore, the term "elements" as is used herein can refer to the transmission elements and/or receiving elements of an antenna assembly.

According to one exemplary embodiment of the present disclosure, an antenna assembly for a level radar can be provided, which can be intended for detecting a topology of a filling material surface by sampling the surface using an electromagnetic signal. According to this exemplary embodiment, the antenna assembly can comprise a plurality of antenna elements which can be configured and/or designed to transmit and/or receive the electromagnetic measurement signal. In such exemplary case, the distances between adjacent elements can be non-equidistant.

For example, the minimum distance between two adjacent elements can be less than or equal to one half of a wavelength of the used electromagnetic measurement signal.

Sampling of the surface using the electromagnetic measurement signal can be understood to mean that an electromagnetic signal is transmitted by at least one transmission antenna element of the antenna assembly, the electromagnetic measurement signal reflected by the filling material surface can be subsequently recorded by the receiving elements, and the picked-up electromagnetic measurement signal can then be evaluated using a control/evaluation unit of the fill level measurement device. In this exemplary case, the antenna assembly can be designed and/or configured such that the entire surface of the filling material can be detected using the electromagnetic measurement signal. This can be achieved by, e.g., it being possible for the elements to emit the electromagnetic measurement signals in various angular ranges and to receive the electromagnetic measurement signals that have been reflected at various angular ranges. It is also possible for the antenna assembly itself to be attached to an antenna support, which can allow the antenna assembly to be rotated or translated above the filling material surface.

According to another exemplary embodiment of the present disclosure, the antenna elements of the antenna assembly that are arranged in a non-equidistant manner can form a one-dimensional linear array.

According to yet another embodiment of the present disclosure, the antenna elements can be arranged on a two-dimensional flat surface. The two-dimensional flat surface can be divided into a plurality of imaginary rows and columns orthogonal thereto, adjacent rows or adjacent columns being equidistant from one another in each case. According to a further embodiment of the present disclosure, the antenna elements can be positioned on the two-dimensional carrier surface such that each of the rows has a different number of elements. As a result, the distance between adjacent elements within the rows is no longer equidistant in each case. It can also be provided for the distances between adjacent elements in one row and/or in one column to be non-equidistant.

According to still another embodiment of the present disclosure, the antenna elements can be arranged in the two-dimensional plane such that the number of elements in each of the columns is different. By comparison with a conventional two-dimensional, planar antenna array in which the spacing between adjacent elements within one row or within one column is the same in each case, an antenna array in which the elements are arranged in a more sparse manner is thus obtained according to the exemplary embodiment of the present disclosure.

According to a further exemplary embodiment of the present disclosure, the planar carrier element for the transmission and receiving elements can be rotationally symmetrical. In this exemplary case, the two-dimensional flat surface can be divided into a plurality of imaginary strips, the strips having a common centroid in the plane that is the same as the centroid of the rotationally symmetrical surface. The strips can be arranged such that, e.g., when one strip can be rotated about the common centroid, such imaginary strip maps onto another strip in the flat surface. In such exemplary case, each strip can have a different number of antenna elements.

The distances between adjacent elements of the antenna assembly that are arranged in a non-equidistant manner can each correspond to an integer multiple of one half of the wavelength of the electromagnetic transmission signal, for example. For example, the transmission signal can have a frequency of 79 GHz. This corresponds to, e.g., a wavelength of approximately 3.8 mm in air.

A fill level measurement device can also be provided comprising an antenna assembly as described herein, according to yet a further exemplary embodiment of the present disclosure.

In another exemplary embodiment of the present disclosure, an evaluation method can be provided for the fill level measurement device as described herein. According to this exemplary method, the elements of the antenna assembly can be divided into a first subgroup of first elements and at least one second subgroup of second elements. In such exemplary case, the elements in the first group can be provided at a first constant distance from one another, and the elements in the second group can be provided at a second constant distance from one another. After an electromagnetic measurement signal has been emitted, the elements in the first group and the elements in the second group can receive the electromagnetic measurement signal reflected by the filling material surface. For example, the control/evaluation unit of the fill level measurement device can be designed such that the echo curves detected by the first group of elements are evaluated first. For this exemplary purpose, a particular target angle can be set at which the detected measurement signals are intended to be evaluated. Digital beam shaping methods, for example, are used for this evaluation. Subsequently, the measurement signals detected by the second subgroup of elements are evaluated at the same target angle. Then, the control/evaluation unit can establish an envelope function which outlines the minima of the formed echo curves at the set target angle. The highest maximum of the resulting envelope function can be used in order to establish the distance between the antenna and the topology point of the surface of the filling material. In this exemplary way, one topology point characterized by the target angle and the distance thereof to the antenna unit can be assigned to each surface point on the filling material surface.

For example, the target angle can be varied such that the entire surface of the filling material can be measured. As a result, a network of topology points, each consisting of a target angle and an associated distance between the antenna assembly and the corresponding surface point on the filling material, can thus be obtained, and this can characterize the three-dimensional filling material surface. Proceeding from a known container bottom surface area, it is thus possible to establish the volume of the filling material by numerical integration, for example. If the density of thefilling material is known, it is also possible to establish the mass of the filling material in the container, for example.

According to still another embodiment of the present disclosure, the method can be implemented as follows. First, an electromagnetic measurement signal can be emitted towards the filling material surface using an antenna element of an antenna system of a fill level measurement device or using a plurality of antenna elements of the antenna system that can be arranged in a non-equidistant manner. In this exemplary case, the minimum distance between adjacent elements corresponds to one half of the wavelength of the electromagnetic measurement signal in air, for example. The minimum distance between adjacent elements can also be slightly greater than or slightly smaller than one half of the wavelength of the measurement signal in air.

The measurement signal reflected by the surface of the filling material can be received and recorded by the antenna elements of the antenna assembly/system that can be arranged in a non-equidistant manner.

Measurement signals can be emitted and subsequently recorded in a corresponding manner until, e.g., the entire filling material surface and/or a relevant region of the filling material surface has been sampled.

For this purpose, it can be provided for the antenna assembly to be mechanically adjusted before the next signal is emitted and received in each case. This is the case, for example, in antennas in which the elements are arranged linearly in one dimension and in which the main radiation direction can be electronically varied along just one axis. By means of electronic control of this type, a particular region of the filling material surface, for example a narrow strip, can be sampled. In this case, however, it is not possible, for example, to detect a region of the filling material surface that extends along an axis which is arranged in the plane of the filling material surface such that it is orthogonal to the narrow strip that can be sampled. By mechanically adjusting the antenna assembly, i.e. by rotating or tilting it for example, the main radiation direction of one-dimensional linear antenna assemblies can be varied gradually such that, when a particular number of steps/procedures has been carried out, the entire three-dimensional surface topology can be detected using the electromagnetic measurement signal.

When using antennas having two-dimensional arrays of transmission and receiving elements, e.g., there may be no need to mechanically adjust the antenna assembly in the manner described herein.

In a subsequent procedure of the method for determining the three-dimensional surface topology of a filling material surface, the received echo curves can be using a control/evaluation unit of the fill level measurement device. In this exemplary case, the method of minima summation can be used. The echo curves that have been picked up at a particular target angle by a first subset of receiving elements of the antenna assembly can be evaluated first, the elements in the first subset being that they are at a constant distance from one another. In a similar manner, the echo curves that have been received by a second subset of elements that are equidistant from one another can be evaluated. By forming the envelope function that outlines the minima of the established echo curves at a fixed target angle, a resulting echo curve can be established, on the basis of which a distance between the filling material and the antenna can be assigned to each target angle. As a result, a topology point is obtained that characterises the surface point.

The target angle at which the echo curves are evaluated in order to determine a corresponding topology point is then continuously varied until the entire filling material surface has been covered by a separate network characterised by the indication of the topology point.

An interface of the evaluation unit of the fill level measurement device can be provided with the established topology points.

According to another aspect of the present disclosure, a program element is provided, which, when executed on a processor of a fill level measurement device, instructs the fill level measurement device to carry out the steps as described above and/or in the following: In a first step, an electromagnetic measurement signal is emitted towards a filling material surface by means of one or more transmission elements of an antenna unit of the fill level measurement device. In a subsequent step, the measurement signal reflected by the surface of the filling material is received by a plurality of elements of the antenna assembly that are arranged in a non-equidistant manner. In the next step, the received signal is evaluated by means of an evaluation unit. In this step, a topology point is assigned to each point on the surface, characterised by a target angle and the spacing between the surface point and the antenna. By varying the target angle, a network of topology points can be established that covers the surface of the filling material in a sufficiently precise manner. The evaluation unit can provide an interface with the established topology points for further calculations.

Another aspect of the present disclosure relates to a computer-readable medium, on which the above program element is stored.

These and other objects, features and advantages of the exemplary embodiments of the present disclosure will become apparent upon reading the following detailed description of the exemplary embodiments of the present disclosure, when taken in conjunction with the appended drawings and claims.

BRIEF DESCRIPTION OF THE DRAWINGS

Further objects, features and advantages of the present disclosure will become apparent from the following detailed description taken in conjunction with the accompanying figures showing illustrative embodiments of the present disclosure, in which.

Figure 1:
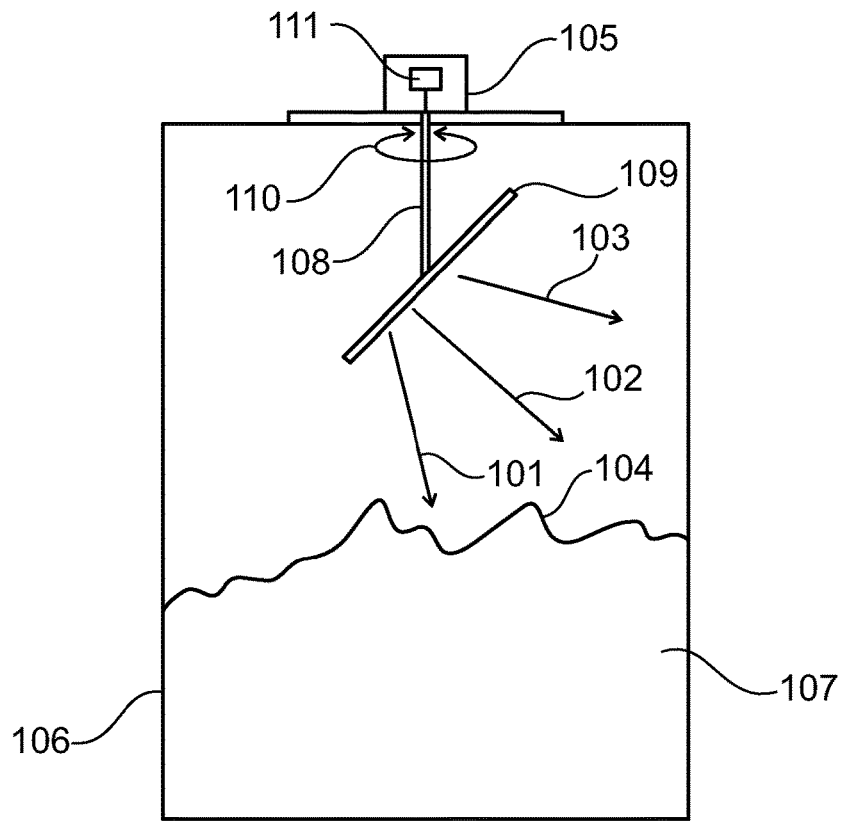
FIG. 1 is a diagram of a fill level measurement device in a container, above a filling material surface, according to an exemplary embodiment of the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative embodiments. It is intended that changes and modifications can be made to the described embodiments without departing from the true scope and spirit of the subject disclosure as defined by the appended claims. The drawings are merely schematic and are not necessarily provided to scale.

DETAILED DESCRIPTION OF EXEMPLARY EMBODIMENTS

FIG. 1 shows a diagram of a fill level measurement device 105 arranged above a filling material surface 104 according to an exemplary embodiment of the present disclosure. The filling material can be located in a container 106, and can have a total volume 107 within the container. Typically (but not necessarily), the surface of the container below the filling material is flat. The fill level measurement device 105 can comprise an antenna 109 that is connected to a control evaluation unit 111 of the fill level measurement device via an antenna support 108. The antenna 109 can be rotatably mounted, for example. For example, the antenna 109 can be provided for the main radiation direction of the antenna to be mechanically adjusted by rotation 110. The antenna elements that are arranged on the antenna 109 and used to transmit a measurement signal, and the receiving elements that are used to receive a measurement signal reflected by the filling material surface, can transmit measurement signals in various angular ranges 101, 102, 103 and/or receive measurement signals at these various angular ranges, respectively.

Depending on the design of the antenna, the antenna can have a particular main radiation direction which initially only allows a particular region of the filling material surface to be sampled. By mechanically adjusting the main radiation direction of an antenna of this exemplary type, it is possible for the entire filling material surface to be sampled; This may be important, for example, in antennas in which receiving elements and transmission elements are arranged linearly in one dimension.

Figures 2A, 2B:
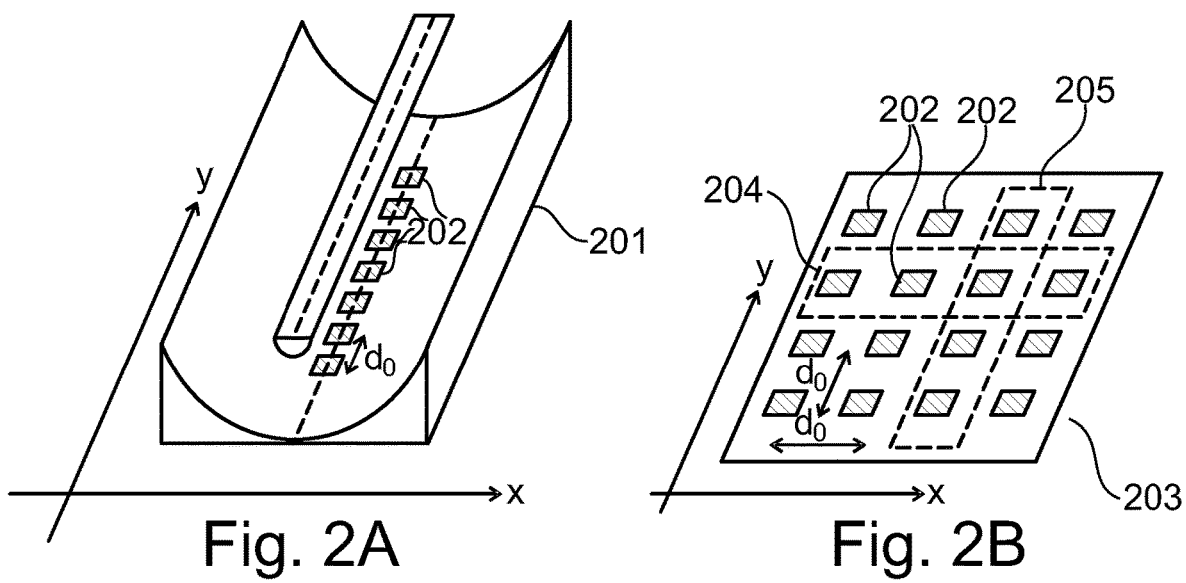
FIG. 2A is a diagram of an antenna in which the antenna elements are arranged linearly in one dimension according to another exemplary embodiment of the present disclosure.
FIG. 2B is a diagram of a two-dimensional antenna array in which the antenna elements are arranged in an equidistant manner according to yet another exemplary embodiment of the present disclosure.

FIG. 2A shows a diagram of an exemplary arrangement of this type in which the elements are arranged linearly in one dimension. For example, elements 202, used to transmit and/or receive an electromagnetic measurement signal, can be arranged in a parabolic trough 201. The elements 202 can have a constant spacing d0. An exemplary arrangement in a parabolic trough as in FIG. 2A facilitates focusing of the measurement signal in the x-direction. The measurement signal can be focused in the y direction by correspondingly evaluating the measurement signals received by the elements 202, using a suitable digital beam shaping method. Therefore, when the antenna is oriented in a constant manner, a particular region of the filling material surface can be sampled. In order to obtain an exemplary three-dimensional surface topology using an antenna assembly shown in FIG. 2A, the antenna can be altered by mechanical adjustment, for example, i.e. by rotation for example, such that different, successive regions of the filling material surface are plotted. The antenna support being rotated, for example, about an axis predetermined by the antenna support through a fixed angle in each case and a measurement signal being subsequently emitted and received in each case means that the entire surface of the filling material can be sampled once the antenna support has been rotated about a total of 360°, for example.

FIG. 2B shows a diagram of an antenna assembly in which the antenna does not need to be mechanically adjusted in order for the entire filling material surface to be sampled according to an exemplary embodiment of the present disclosure. The antenna elements 202 can be arranged on a planar carrier 203. Adjacent elements 202 are at a constant distance d0 from one another in both the x-direction and the y direction. The planar carrier 203 can be divided into imaginary rows 204 and imaginary columns 205, rows and columns being arranged orthogonally to one another in each case, and adjacent rows or adjacent columns being equidistant from one another in each case. The position of an element 202 on the planar carrier 203 can therefore be uniquely identified by the row position and column position being defined. In order to be able to obtain a three-dimensional surface topology of the filling material surface, it can be provided for the elements 202 to each be able to be actuated and read out individually.

For example, one configuration of a two-dimensional antenna array of this type can have 20 radiator elements×20 receiving elements. When the measurement signal frequency is 79 GHz, this results in a wavelength of approximately 3.8 mm in air, and therefore the extent of a planar antenna assembly in the x direction and the y direction is of the order of magnitude of approximately 4 cm.

The exemplary hardware complexity for a two-dimensional antenna array of this type, in which each of the approximately 400 elements 202 are actuated and read out separately, is very high. The software for evaluating the measurement signal received by the elements 202 can be also complex, since the signals from each individual element 202 have to first be evaluated and then set against the remaining signals from the remaining elements.

One of the objects of the present disclosure can be to reduce the hardware complexity and the software complexity involved in detecting a three-dimensional surface topology viaan antenna assembly.

Figures 3A, 3B:
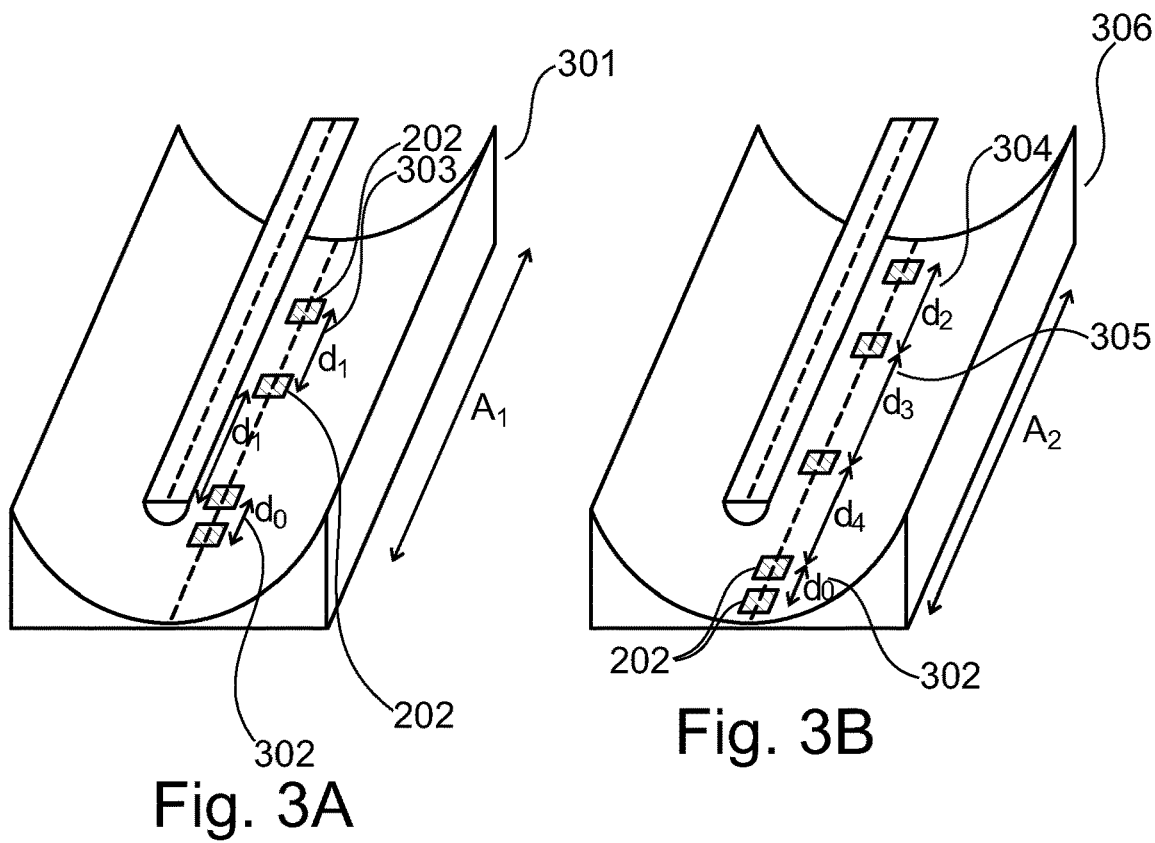
FIG. 3A is a diagram of an antenna assembly according to an exemplary embodiment of the present disclosure, in which the antenna elements are arranged in a non-equidistant manner.
FIG. 3B is a diagram of the antenna assembly according to a further exemplary embodiment of the present disclosure, in which the distances between adjacent elements have more than two different values.

FIG. 3A shows a diagram of another antenna assembly for determining a topology when a fill level measurement is being taken, according to another exemplary embodiment of the present disclosure. For example, the antenna 301 can comprise a parabolic trough in which elements 202 are arranged, whereas adjacent elements can be provided at a minimum distance d0, 302 or a larger distance d1, 303 from one another in the one-dimensional linear orientation of the elements.

FIG. 3B shows a diagram of yet another exemplary embodiment of an antenna assembly 306 of the present disclosure, again showing a parabolic trough, in which the antenna elements 202 can be at a plurality of different spacings d0, 302, d2, 304, d3, 305 from one another.

The number of different spacings shown in FIG. 3B is given by way of example. In particular, the present disclosure is not limited to the shown number of different spacings.

By comparison with the antenna shown in FIG. 2A, FIG. 3A and FIG. 3B illustrate exemplary embodiments in which the elements 202 are arranged in exemplary a more sparse manner. This makes it possible to reduce the hardware complexity and to subsequently make the evaluation of the received measurement signals less complex.

Figure 4:
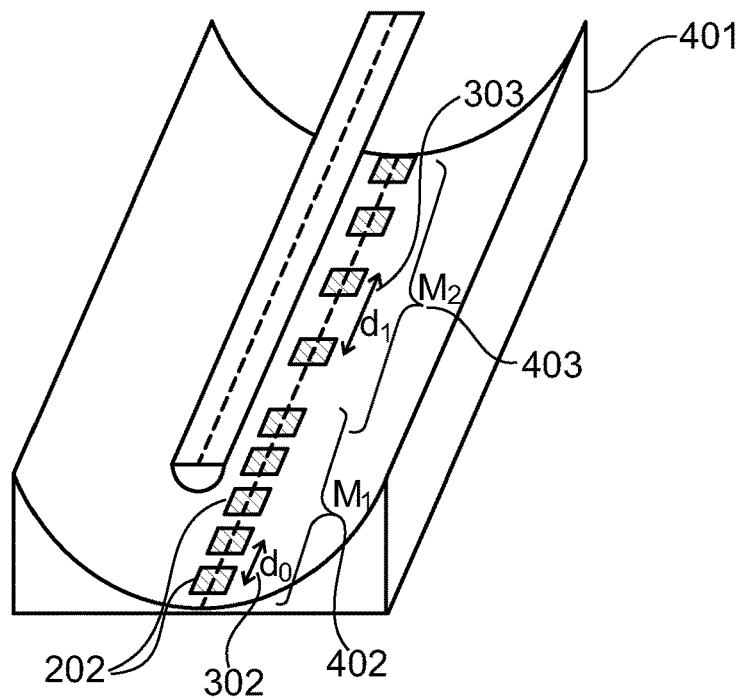
FIG. 4 is a diagram of an antenna assembly according to yet another embodiment of the present disclosure, in which the elements are arranged linearly in one dimension and in which the elements are divided into two different groups, the distance between the elements in one group being constant and the distance between the elements in the second group being greater than the distance between the elements in the first group.

FIG. 4 shows a diagram of yet another exemplary embodiment of an antenna assembly 401 according to the present disclosure. For example, the antenna elements 202 can again be arranged in a parabolic trough in a one-dimensional linear arrangement. As shown in FIG. 4, these exemplary antenna elements 202 are divided into a first subset M1, 402 and a second subset M2, 403. The elements in the first subset M1, 402 can be at a constant spacing d0, 302 from one another in each case. The elements in the second subset M2 can be at a constant spacing d1, 303 from one another in each case that is greater than the constant spacing d0 between the elements in the first subset.

Indeed, FIG. 4 depicts the situation in which one particular element belongs to just one particular subset, for example M1. In general, however, an element can belong to several subsets.

Figure 5:
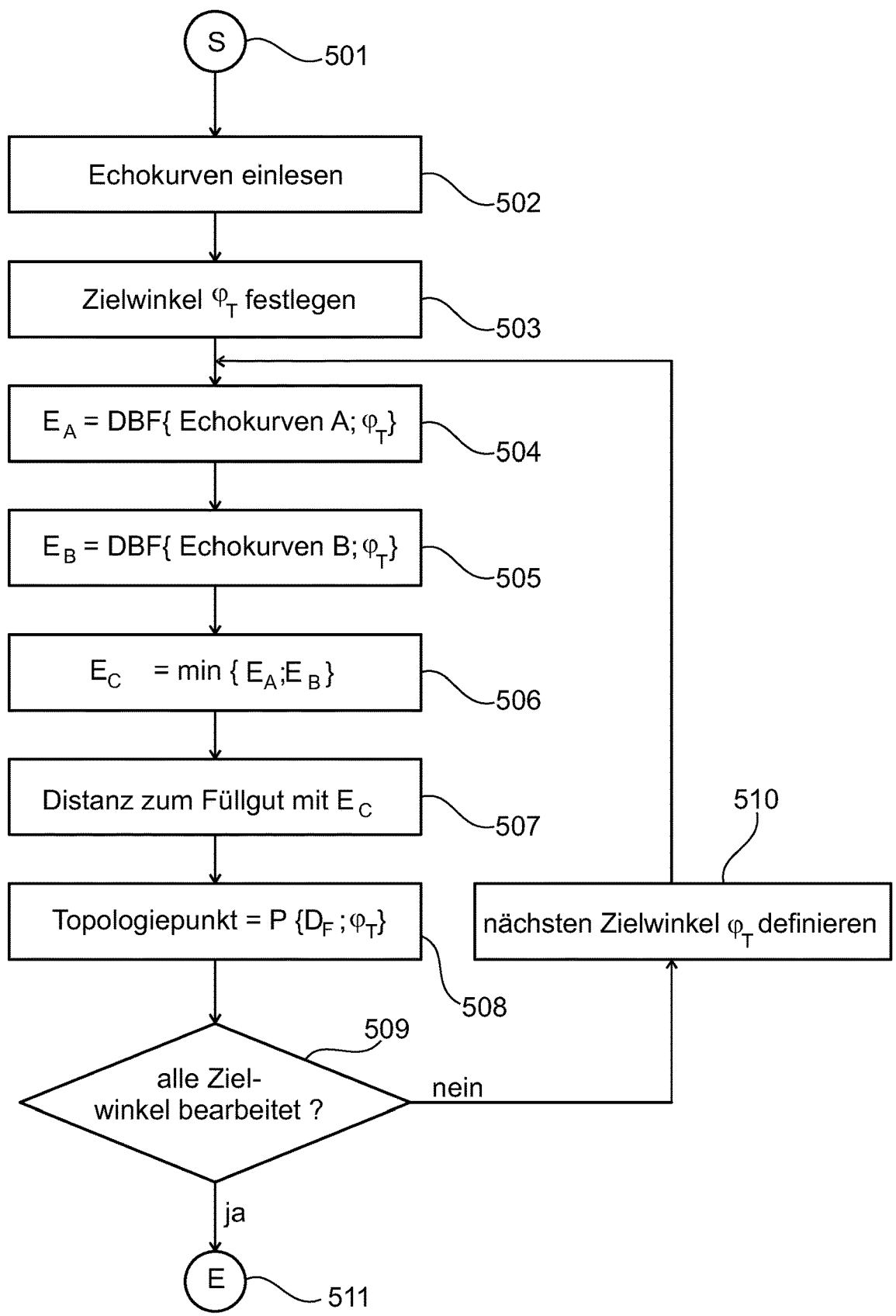
FIG. 5 is a flow diagram of an evaluation method for determining the surface topology of a filling material surface by sampling the surface by means of an electromagnetic measurement signal according to an exemplary embodiment of the present disclosure.

The flow diagram in FIG. 5 shows a method that is designed for evaluating the measurement signals using, e.g., the antenna assembly shown in FIG. 4 according to an exemplary embodiment of the present disclosure.

The method shown in FIG. 5 starts with the measurement signal reflected by the filling material surface being recorded in procedure 501. The measurement signals recorded by the antenna elements 202 can be read into a control and evaluation unit (procedure 502). In the next procedure, i.e., procedure 503, a target angle ☐t can be set. The recorded echo curves are firstly evaluated at this target angle. For this purpose, the echo curves for each of the elements 202 belonging to the subset M1, 404 can be evaluated initially in sub-procedure 504. The evaluation can be carried out using digital beam shaping methods. These exemplary methods include FFT, phase shifting and summation. In the next sub-procedure, procedure 505, the echo curves recorded by the elements belonging to the second subset M2, 403 are calculated in the same way. If the elements of the exemplary antenna assembly are divided into more than two subsets, this exemplary method can be repeated for the signals recorded by the elements in the remaining subsets.

In procedure 506 of the exemplary evaluation method shown in FIG. 5, an envelope can be formed which outlines or corresponds to the minima of the echo curves of the first subset and the echo curves of the second subset. The distance to the filling material can be calculated from the resulting echo curve EC using known methods (step 507). As a result, a topology point, composed of a set target angle (azimuth angle θ and/or elevation angle ☐t) and the distance between the antenna and the filling material, is assigned to a point on the filling material surface. In step 508, this topology point is stored in a memory of the evaluation unit.

In the next step of the evaluation method, procedure 509, it is queried whether all of the previously defined target angles have been processed. If this is not the case, in step procedure, the next target angle is defined and the echo curves are evaluated for this new target angle according to procedure 504 to 508.

If it is determined in procedure 509 that all of the target angles have been processed, the method for evaluating the echo curves ends in procedure 511, by the established network of topology points, which characterize the three-dimensional filling material surface, being provided for further evaluation. At this point, the volume of the filling material in the container can be determined, for example. If the density of the filling material is known, it is also possible to establish variables derived therefrom, such as the mass of the filling material.

Figure 6:
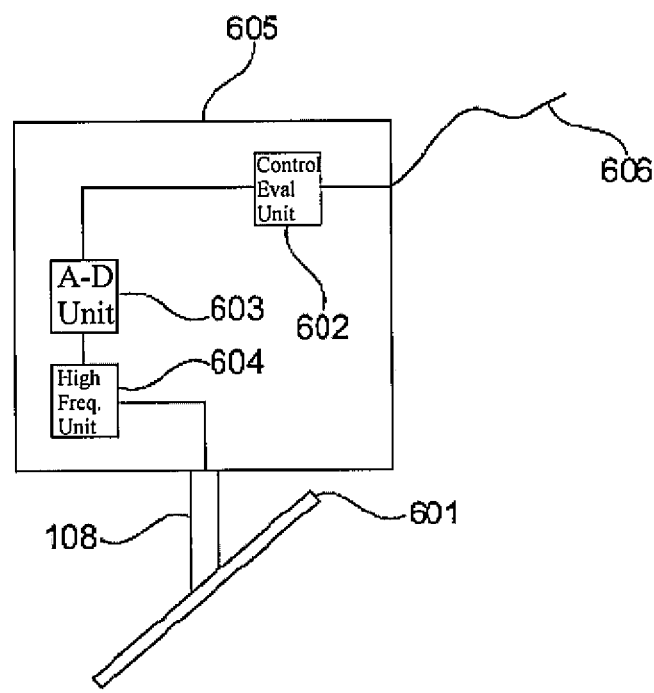
FIG. 6 is a diagram of a fill level measurement device, according to a further embodiment of the present disclosure, comprising an antenna assembly and an associated evaluation unit.

FIG. 6 shows a diagram of a fill level measurement device according to an exemplary embodiment of the present disclosure that comprises an antenna 601 which can be designed according to any of the above-described examples. The exemplary antenna 601 can be connected to the control and evaluation unit 602 (for example, a microprocessor, DSP, FPGA or PC) of the fill level measurement device 605 via an antenna support 108. The exemplary fill level measurement device can comprise a high-frequency unit 604 in which the high-frequency measurement signal recorded by the receiving elements is translated into the low-frequency range. Subsequently, the signal, which can now be a low-frequency signal, can be digitalized in an analog-digital unit 603, and is then supplied to the evaluation unit 602. The control and evaluation unit 602 can evaluate the signal that has been provided in this manner with the exemplary evaluation method shown in FIG. 5, for example. An interface 606 can then be provided with the output variables from this evaluation, whereas the interface can be, for example, a 4 . . . 20 mA interface, a HART interface, a Profibus interface, an Ethernet interface, a Bluetooth interface, a WLAN interface, a WiFi interface or a USB interface.

Figure 7A:
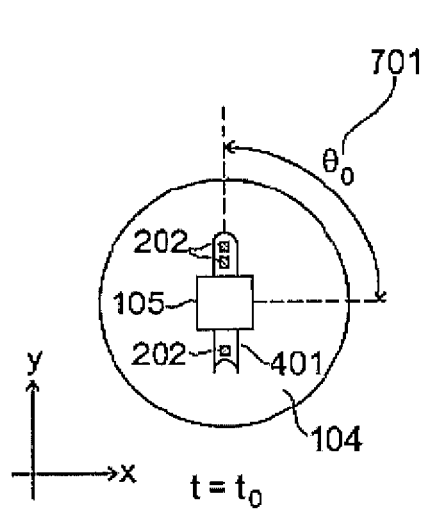
FIG. 7A is a graph of one operating state of an antenna assembly according to an exemplary embodiment of the present disclosure, in which the elements are arranged linearly in one dimension on the antenna.
Figure 7B:
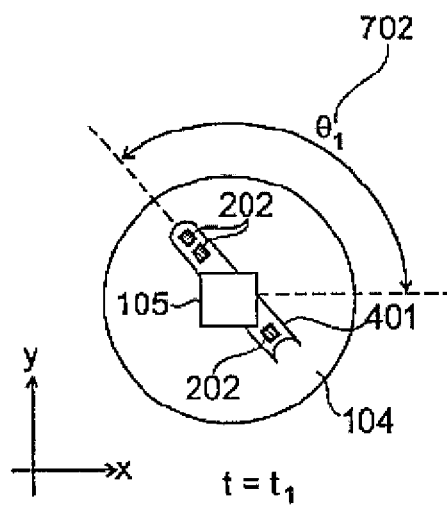
FIG. 7B is a graph of another operating state of the antenna assembly according to a further exemplary embodiment of the present disclosure, in which the elements are arranged linearly in one dimension on the antenna.

FIGS. 7A and 7B show graphs of two exemplary operating states of an antenna assembly according to an exemplary embodiment of the present disclosure. FIGS. 7A and 7B illustrate both plan views of the antenna assembly, which is located above a filling material surface 104. In accordance with an exemplary antenna design, an antenna 401 is shown, in which the exemplary elements 202 are arranged linearly in one dimension and which is part of the exemplary measurement device 605, as shown in FIG. 6, for example.

The elements 202 can be arranged on the antenna 401 in a non-equidistant manner. A first operating state is shown in FIG. 7A, i.e., at a time t=t0, the antenna has a fixed angle θ0, 701 to a fixed direction in space, which is the x axis illustrated in FIG. 7A. In this exemplary configuration, corresponding measurement signals are transmitted and recorded by the elements of the antenna assembly. As shown in FIG. 7B, the antenna assembly can have a second angle θ1, 702 to the fixed axis (x axis) at a later time t=t1, the angle θ1 being greater than the angle θ0. By gradually varying the angle in a corresponding manner, e.g., the entire filling material surface 104 can be scanned.

Figure 8:
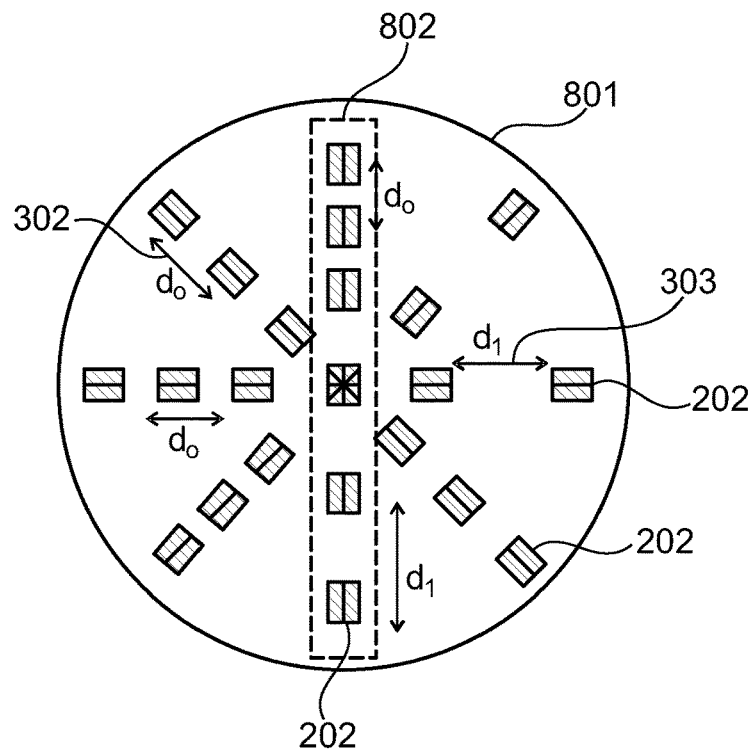
FIG. 8 a diagram of a non-rotatably mounted antenna assembly, according to an exemplary embodiment of the present disclosure, in which the elements are arranged on a radially symmetrical carrier.

FIG. 8 shows a diagram of a non-rotatably mounted antenna assembly according to still another exemplary embodiment of the present disclosure. The exemplary antenna elements 202 can be positioned on a rotationally symmetrical planar carrier 801. The rotationally symmetrical surface can be divided into imaginary strips 802. The centroid of the strips coincides with the centroid of the rotationally symmetrical surface. By rotating one strip about the centroid thereof, the strip can map onto another imaginary strip. In each of the imaginary strips 802, there is a plurality of antenna elements 202, the elements not being at a constant spacing from one another, for example. The exemplary minimum spacing d0, 302 can correspond to one half of the wavelength of the used measurement signal in air. Other exemplary spacings d1, 303 can be greater than the minimum spacing d0. The non-rotatably mounted antenna, shown by way of example in FIG. 8, is characterised in that the columns 802 each comprise elements which are at different distances from one another.

Figure 9:
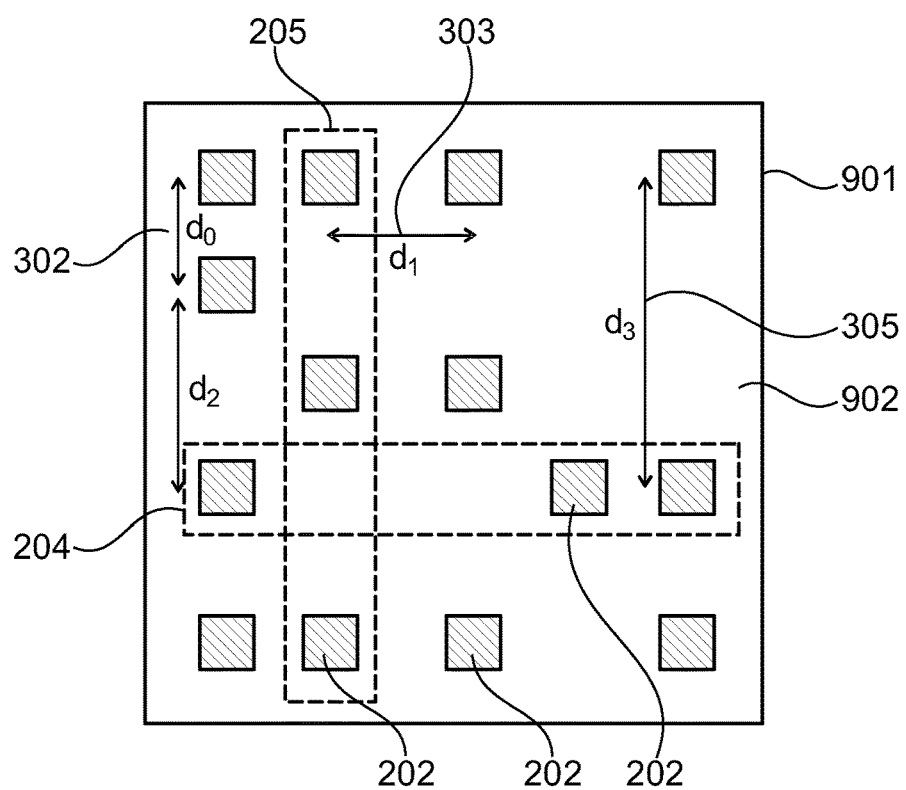
FIG. 9 a diagram of the antenna assembly, according to another exemplary embodiment of the present disclosure, in which the elements are arranged on a planar rectangular carrier and are not at the same spacing from one another in each case.

FIG. 9 shows a diagram of another exemplary embodiment of an antenna assembly according to the present disclosure. In particular, FIG. 9 illustrates a planar carrier 901 which is divided into a plurality of imaginary rows 204, which are at a constant spacing from one another in each case, and a plurality of imaginary columns 205, which are likewise at a constant spacing from one another in each case. According to one exemplary embodiment of the present disclosure, the rows 204 can each contain a different number of elements 202 and/or can contain elements 202 having different distances between adjacent elements. In this exemplary case, the minimum distance between adjacent elements within one row is specified as d0, 302, and any other number of spacings is also possible. For example, FIG. 9 shows the exemplary spacings d1, 303, d2, 304 and d3, 305.

According to one exemplary embodiment of the present disclosure, the distances d1, d2, d3 may correspond to integer multiples of one half of the wavelength of the electromagnetic measurement signal.

Typically, the "wavelength" can be the wavelength when air is the medium. It is also possible for the antenna assembly to be located in a different medium, for example, in a liquid. In this exemplary case, the wavelengths can be the wavelengths in the corresponding medium.

According to another exemplary embodiment of the present disclosure, the number of elements 202 in the columns 205 and rows 204 in FIG. 9 is different in part.

FIG. 9 shows a diagram of a sparse antenna array 902 on a planar carrier 901 according to yet another exemplary embodiment of the present disclosure, in which the hardware and software involved in detecting a three-dimensional surface topology by sampling by means of an electromagnetic signal can be made less complex by comparison with corresponding arrays in which the elements are at a constant spacing from one another.

Figure 10A:
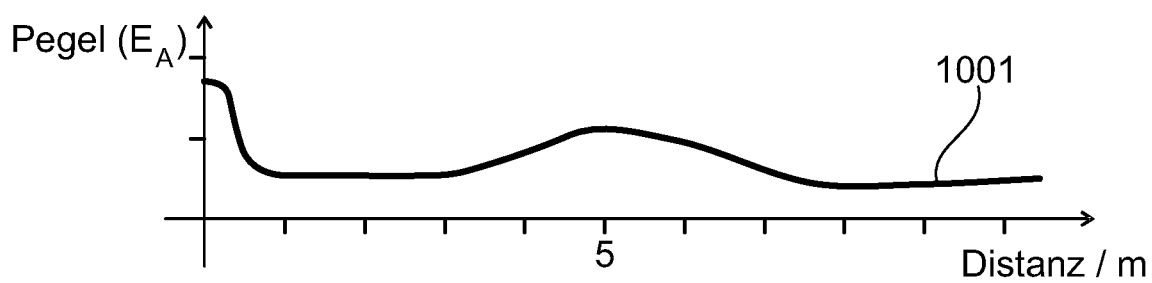
FIGS. 10A-10C are graphs of echo curves of an electromagnetic measurement signal reflected by the filling material surface, where echo curves are detected by the receiving elements, according to an exemplary embodiment of the present disclosure.
Figure 10B:
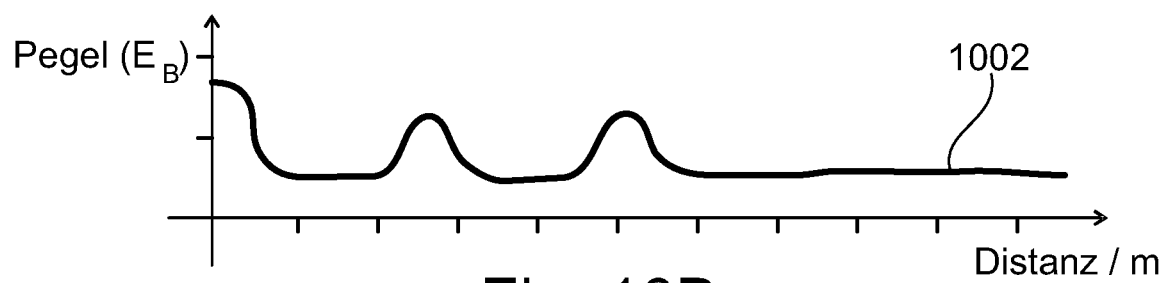
Figure 10C:
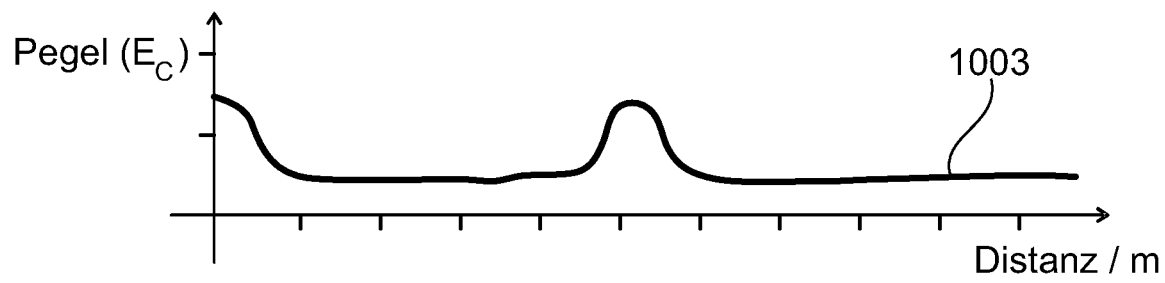

FIG. 10A to 10C show graphs of exemplary echo curves EA, EB and EC calculated according to the sequence illustrated in FIG. 5.

In particular, the graph of FIG. 10A shows the signal level 1001 of the echo curve EA as a function of distance in meters. In addition to a maximum at the source, another local maximum can be seen at a distance of five meters, for example. An echo curve of this type could have been calculated, for example, from the measurement curves of the elements 202 belonging to the first subgroup M1, 402 of elements of the antenna 401, using, e.g., digital beam shaping. As an example, these elements can be precisely at the minimum distance d0, 302 from one another, whereas the minimum distance may correspond to one half of the wavelength of the measurement signal.

FIG. 10B shows a graph of the level 1002 of the echo curve EB as a function of distance in meters, as could have been calculated, using, e.g., the digital beam shaping, from the measurement curves of a second subgroup M2, 403 of elements which are at a distance d1>d0 from one another. In this exemplary case, the level not only has a maximum at the source and at a distance of five meters, but a secondary maximum can also be seen between these two maxima. Secondary maxima of this type, as shown in FIG. 10B, can be referred to as "grating lobes" in the literature, and can be attributed to the fact that the spacing between the elements that are used to record the measurement signals from the subgroup M2, 403 of elements is greater than one half of the wavelength of the electromagnetic signal used.

FIG. 10C shows a graph of a combination 1003 of the echo curve EA from FIG. 10A and the echo curve EB from FIG. 10B, according to an exemplary embodiment of the present disclosure. This exemplary resulting curve corresponds precisely to the envelope of the minima of the two echo curves 1001, from FIG. 10A, and 1002, from FIG. 10B. Such curve results from the relevant minimum of the echo curve 1001 and from the relevant minimum of the echo curve 1002 at the same distance. The resulting echo curve 1003 shown in FIG. 10C, e.g., does not have any secondary maxima like those that occur in curve 1002 in FIG. 10B. It is possible to ultimately determine the distance between the point on the filling material surface and the antenna from the maximum at a distance of approximately five metres in the example curve in FIG. 10C, which maximum is more sharply defined than the maximum at this distance in curve 1001 in FIG. 10A.

This exemplary method thus facilitates an accurate detection of a topology point of the filling material surface without this requiring a plurality of non-equidistant antenna elements. By forming the envelope function 1003, as shown in FIG. 10C, the same distance information can in particular be obtained as is obtained when using antennas in which the antenna elements are at an equidistant spacing d0.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. In addition, all publications and references referred to above can be incorporated herein by reference in their entireties. It should be understood that the exemplary procedures described herein can be stored on any computer accessible medium, including a hard drive, RAM, ROM, removable disks, CD-ROM, memory sticks, etc., and executed by a processing arrangement and/or computing arrangement which can be and/or include a hardware processors, microprocessor, mini, macro, mainframe, etc., including a plurality and/or combination thereof. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it can be explicitly being incorporated herein in its entirety.

In addition, it should be mentioned that the terms "comprising" and "having" do not exclude any other elements or steps, and "a" or "an" does not rule out more than one. It should further be pointed out that features or steps described with reference to one of the above embodiments may also be used in combination with other features or steps of other above-described embodiments. Reference numerals in the claims should not be treated as limiting.

The invention claimed is:

1. A fill level measurement device comprising:
   an antenna assembly for detecting a topology of a surface of a filling material by sampling the surface using an electromagnetic measurement signal, the antenna assembly comprising antenna elements configured to at least one of transmit or receive the electromagnetic measurement signal, wherein distances between adjacent elements of the antenna elements are non-equidistant; and
   a control and evaluation unit,
   wherein the antenna elements of the antenna assembly comprise first elements of the antenna elements and second elements of the antenna elements,
   wherein the first elements are provided at a first distance from one another,
   wherein the second elements are provided at a second distance from one another, the second distance being greater than the first distance,
   wherein the control and evaluation unit is configured to form a first echo curve from the electromagnetic measurement signal detected by the first elements at a particular target angle,
   wherein the control and evaluation unit is configured to form a second echo curve from the electromagnetic measurement signal detected by the second elements at the particular target angle,
   wherein the control and evaluation unit is further configured to establish an envelope function which outlines the minima of the formed first and second echo curves at the particular target angle, and
   wherein the control and evaluation unit is further configured to determine a topology point of the surface of the filling material from the envelope function.

2. The fill level measurement device according to claim 1, wherein a minimum distance between two adjacent elements of the antenna elements is at most one half of a wavelength of the electromagnetic measurement signal.

3. The fill level measurement device according to claim 1, wherein the antenna elements which are arranged at the non-equidistant distances from one another form a one-dimensional linear array.

4. The fill level measurement device according to claim 1, wherein the antenna elements which are arranged at the non-equidistant distances from one another form a two-dimensional flat surface.

5. The fill level measurement device according to claim 4, wherein the two-dimensional flat surface is divided into a plurality of imaginary rows and columns orthogonal to one another, and a position of each of the antenna elements provided in the two-dimensional surface is uniquely determined by a respective row position and a respective column position of the imaginary rows and columns, respectively, and
wherein each of the imaginary rows has a different number of the antenna elements.

6. The fill level measurement device according to claim 5, wherein each of the imaginary columns has a different number of elements from a different respective one of the imaginary columns.

7. The fill level measurement device according to claim 4, wherein the two-dimensional flat surface is divided into a plurality of imaginary strips, the strips having a common centroid in a plane,
wherein one of the imaginary strips maps onto another one of the imaginary strips in the flat surface by being rotated about the common centroid, and
wherein each of the imaginary strips has a different number of elements from a different one of the imaginary strips.

8. The fill level measurement device according to claim 1, wherein each of the distances between the at least two sets of the adjacent elements that are arranged in the non-equidistant manner corresponds to an integer multiple of one half of a wavelength of the electromagnetic measurement signal.

9. The fill level measurement device according to claim 1, wherein the antenna assembly is attached to an antenna support, and wherein the antenna support predetermines an axis of rotation,
wherein the antenna support has a drive unit, and
wherein the drive unit is designed configured to facilitate a rotation about the axis of rotation of the antenna assembly.

10. A method for determining a topology of a surface of a filling material or a bulk material, the method comprising:
emitting an electromagnetic measurement signal towards the surface via an antenna system;
receiving the electromagnetic measurement signal reflected by the surface using a plurality of antenna elements of the antenna system that are arranged in a non-equidistant manner with respect to one another, wherein the antenna elements of the antenna assembly comprise first elements of the antenna elements and second elements of the antenna elements, wherein the first elements are provided at a first distance from one another, and wherein the second elements are provided at a second distance from one another, the second distance being greater than the first distance;
forming a first echo curve from the electromagnetic measurement signal detected by the first elements at a particular target angle;
forming a second echo curve from the electromagnetic measurement signal detected by the second elements at the particular target angle;
evaluating received echo curves provided via the electromagnetic measurement signal using an evaluation unit;
establishing an envelope function which outlines the minima of the formed first and second echo curves at the particular target angle;
determining a topology point of the surface of the filling material from the envelope function;
calculating at least one of the topology of the surface or at least one value derived therefrom; and
providing an interface using the derived value.

11. A non-transitory computer-accessible medium storing a computer program thereon or therein for determining a topology of a surface of a filling material or a bulk material, wherein when the computer program it is executed by a processor of a fill level measurement device, configures and instructs the fill level measurement device to perform procedures comprising:
emitting an electromagnetic measurement signal the surface via an antenna system;
receiving the electromagnetic measurement signal reflected by the surface using a plurality of antenna elements of the antenna system that are arranged in a non-equidistant manner with respect to one another, wherein the antenna elements of the antenna assembly comprise first elements of the antenna elements and second elements of the antenna elements, wherein the first elements are provided at a first distance from one another, and wherein the second elements are provided at a second distance from one another, the second distance being greater than the first distance;
forming a first echo curve from the electromagnetic measurement signal detected by the first elements at a particular target angle;
forming a second echo curve from the electromagnetic measurement signal detected by the second elements at the particular target angle;
evaluating received echo curves provided via the electromagnetic measurement signal using an evaluation unit;
establishing an envelope function which outlines the minima of the formed first and second echo curves at the particular target angle;
determining a topology point of the surface of the filling material from the envelope function;
calculating at least one of the topology of the surface or at least one value derived therefrom; and
providing an interface using the derived value.

* * * * *